US008838040B2

(12) United States Patent
Wellington

(10) Patent No.: US 8,838,040 B2
(45) Date of Patent: Sep. 16, 2014

(54) SYSTEM AND METHOD FOR LINK ADAPTATION FOR VARIABLE LINK CONDITIONS

(71) Applicant: Dan Wellington, Boulder, CO (US)

(72) Inventor: Dan Wellington, Boulder, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 36 days.

(21) Appl. No.: 13/725,862

(22) Filed: Dec. 21, 2012

(65) Prior Publication Data

US 2013/0136022 A1 May 30, 2013

Related U.S. Application Data

(63) Continuation of application No. 12/274,014, filed on Nov. 19, 2008, now Pat. No. 8,340,586.

(51) Int. Cl.
*H04B 1/00* (2006.01)
*H04W 24/04* (2009.01)
*H04L 1/00* (2006.01)
*H04L 1/16* (2006.01)

(52) U.S. Cl.
CPC .............. *H04W 24/04* (2013.01); *H04L 1/1607* (2013.01); *H04L 1/0016* (2013.01); *H04L 1/0009* (2013.01)
USPC .......................................................... 455/69

(58) Field of Classification Search
CPC .................................................... H04W 52/24
USPC .......................................................... 455/69
See application file for complete search history.

(56) References Cited

U.S. PATENT DOCUMENTS

| 6,778,839 | B2 | 8/2004 | Valkealahti | |
|---|---|---|---|---|
| 2002/0187799 | A1* | 12/2002 | Haartsen | 455/509 |
| 2003/0021243 | A1* | 1/2003 | Hamalainen | 370/329 |
| 2003/0189915 | A1* | 10/2003 | Miller | 370/343 |
| 2004/0233895 | A1* | 11/2004 | Linares | 370/352 |
| 2006/0256732 | A1* | 11/2006 | Hamalainen | 370/252 |
| 2008/0086662 | A1* | 4/2008 | Li et al. | 714/704 |

FOREIGN PATENT DOCUMENTS

WO    WO-2010059644    5/2010

OTHER PUBLICATIONS

Bonald, T. "A Score-Based Opportunistic Scheduler for Fading Radio Channels," France Telecom R&D, 2004, 7 pages.

(Continued)

*Primary Examiner* — April G Gonzales
(74) *Attorney, Agent, or Firm* — Perkins Coie LLP

(57) ABSTRACT

Systems, apparatus, methods, and manufactures for performing link adaptation in a communications system are described. The methods may employ an error rate table that has a channel condition value dimension and a transmission parameter dimension. The elements of the error rate table include expected error rates for data transmitted at various channel conditions according to various transmission parameters. Also, the various transmission parameters may each be associated with a data transmission rate. For a given channel condition value, the methods may determine expected throughputs for each of the transmission parameters according to the associated expected error rates and data transmission rates. A transmission parameter may be selected according to the expected throughputs.

30 Claims, 6 Drawing Sheets

(56) References Cited

OTHER PUBLICATIONS

Holma, H. and Toskala, A., editors, *HSDPA/HSUPA for UMTS*, Copyright 2006 John Wiley and Sons.
"HSDPA for Improved Downlink Data Transfer," QUALCOMM CDMA Technologies White Paper, Oct. 2004, Copyright 2004 QUALCOMM Incorporated, 18 pages.
Huang, Yicheng, et al. "Optimization of Source and Channel Coding for Voice over IP," School of Computing, National University of Singapore, 2005 IEEE, 4 pages.
Kolding, Troels E., "Link and System Performance Aspects of Proportional Fair Scheduling in WCDMA/HSDPA," Nokia Networks, Aalborg, Denmark, 2003 IEEE, pp. 1717-1722.
Manfredi, Giorgio, et al. "A Channel Aware Scheduling Algorithm for HSDPA System," 2005 IEEE 16th International Symposium on Personal, Indoor and Mobile Radio Communications, pp. 2136-2140.
Tapia, Pablo, et al. "Practical Considerations of HSDPA Performance," Network Evolution and Strategy Group, T-Mobile USA, 2007 IEEE, pp. 111-115.
International Search Report and Written Opinion, International Application No. PCT/US2009/064853, filed Nov. 17, 2009, Applicant: T- Mobile USA, Inc., mailed Jun. 18, 2010, 12 pages.

* cited by examiner

FIG. 4

Transmission Parameter Dimension (e.g., transport block size) — 420

Channel Condition Value Dimension (e.g., channel quality indicator) — 410

| CQI | 0 | 365 | 699 | 1036 | 1380 | 1711 | 2046 | 2404 | 2726 | 3090 | 3440 |
|---|---|---|---|---|---|---|---|---|---|---|---|
| 0.00 | 0.00 | 0.01 | 0.00 | 0.01 | 0.00 | 0.00 | 0.01 | 0.00 | 0.00 | 0.00 | 0.00 |
| 1.00 | 0.00 | 0.01 | 0.01 | 0.00 | 0.01 | 0.01 | 0.00 | 0.00 | 0.01 | 0.01 | 0.01 |
| 2.00 | 0.00 | 0.01 | 0.01 | 0.00 | 0.00 | 0.00 | 0.00 | 0.00 | 0.00 | 0.00 | 0.00 |
| 3.00 | 0.00 | 0.01 | 0.01 | 0.00 | 0.00 | 0.00 | 0.00 | 0.00 | 0.00 | 0.00 | 0.00 |
| 4.00 | 0.00 | 0.01 | 0.01 | 0.55 | 0.00 | 0.00 | 0.00 | 0.00 | 0.00 | 0.00 | 0.00 |
| 5.00 | 0.00 | 0.00 | 0.00 | 0.38 | 0.00 | 0.00 | 0.00 | 0.00 | 0.00 | 0.00 | 0.00 |
| 6.00 | 0.00 | 0.33 | 0.01 | 0.23 | 0.44 | 0.00 | 0.00 | 0.00 | 0.00 | 0.00 | 0.00 |
| 7.00 | 0.00 | 1.00 | 1.00 | 0.35 | 0.47 | 0.43 | 0.00 | 0.00 | 0.00 | 0.00 | 0.00 |
| 8.00 | 0.00 | 0.67 | 1.00 | 0.56 | 0.90 | 0.43 | 0.36 | 0.00 | 0.00 | 0.00 | 0.00 |
| 9.00 | 0.00 | 1.00 | 0.01 | 0.54 | 1.00 | 0.88 | 0.61 | 0.00 | 0.00 | 0.00 | 0.00 |
| 10.00 | 0.00 | 1.00 | 0.01 | 0.80 | 0.01 | 0.86 | 0.70 | 0.36 | 0.00 | 0.00 | 0.00 |
| 11.00 | 0.00 | 0.01 | 0.01 | 1.00 | 1.00 | 0.97 | 0.83 | 0.70 | 0.17 | 0.19 | 0.23 |
| 12.00 | 0.00 | 0.01 | 0.01 | 1.00 | 1.00 | 1.00 | 0.78 | 0.89 | 0.71 | 0.27 | 0.45 |
| 13.00 | 0.00 | 0.01 | 0.01 | 1.00 | 1.00 | 1.00 | 0.90 | 0.93 | 0.81 | 0.36 | 0.79 |
| 14.00 | 0.00 | 0.01 | 0.01 | 1.00 | 1.00 | 1.00 | 0.93 | 0.97 | 0.97 | 0.71 | 0.87 |
| 15.00 | 0.00 | 0.01 | 0.01 | 1.00 | 1.00 | 1.00 | 0.98 | 1.00 | 0.96 | 0.88 | 0.95 |
| 16.00 | 0.00 | 0.01 | 0.01 | 1.00 | 0.01 | 1.00 | 1.00 | 1.00 | 1.00 | 0.95 | 0.98 |
| 17.00 | 0.00 | 0.01 | 0.01 | 1.00 | 1.00 | 1.00 | 1.00 | 1.00 | 1.00 | 1.00 | 0.99 |
| 18.00 | 0.00 | 0.01 | 0.01 | 1.00 | 0.01 | 0.01 | 1.00 | 1.00 | 1.00 | 1.00 | 1.00 |
| 19.00 | 0.00 | 0.01 | 0.01 | 0.01 | 0.01 | 0.01 | 1.00 | 1.00 | 1.00 | 1.00 | 1.00 |
| 20.00 | 0.00 | 0.01 | 0.01 | 0.01 | 0.01 | 0.01 | 1.00 | 1.00 | 1.00 | 1.00 | 1.00 |
| 21.00 | 0.00 | 0.01 | 0.01 | 1.00 | 0.01 | 0.01 | 0.01 | 1.00 | 1.00 | 1.00 | 1.00 |
| 22.00 | 0.00 | 0.01 | 0.01 | 0.01 | 0.01 | 0.01 | 0.01 | 0.01 | 1.00 | 1.00 | 1.00 |
| 23.00 | 0.00 | 0.01 | 0.01 | 0.01 | 0.01 | 0.01 | 0.01 | 0.01 | 0.01 | 1.00 | 1.00 |
| 24.00 | 0.00 | 0.01 | 0.01 | 0.01 | 0.01 | 0.01 | 0.01 | 0.01 | 0.01 | 0.01 | 1.00 |
| 25.00 | 0.00 | 0.01 | 0.01 | 0.01 | 0.01 | 0.01 | 0.01 | 0.01 | 0.01 | 0.01 | 1.00 |
| 26.00 | 0.00 | 0.01 | 0.01 | 0.01 | 0.01 | 0.01 | 0.01 | 0.01 | 0.01 | 0.01 | 1.00 |
| 27.00 | 0.00 | 0.01 | 0.01 | 0.01 | 0.01 | 0.01 | 0.01 | 0.01 | 0.01 | 0.01 | 0.01 |
| 28.00 | 0.00 | 0.01 | 0.01 | 0.01 | 0.01 | 0.01 | 0.01 | 0.01 | 0.01 | 0.01 | 0.01 |
| 29.00 | 0.00 | 0.01 | 0.01 | 0.01 | 0.01 | 0.01 | 0.01 | 0.01 | 0.01 | 0.01 | 0.01 |
| 30.00 | 0.00 | 0.01 | 0.01 | 0.01 | 0.01 | 0.01 | 0.01 | 0.01 | 0.01 | 0.01 | 0.01 |

SYSTEM AND METHOD FOR LINK ADAPTATION FOR VARIABLE LINK CONDITIONS

CROSS-REFERENCE TO RELATED APPLICATION

This application is a continuation of U.S. patent application Ser. No. 12/274,014, filed Nov. 19, 2008, and entitled SYSTEM AND METHOD FOR LINK ADAPTATION FOR VARIABLE LINK CONDITIONS, now granted U.S. Pat. No. 8,340,586, issued Dec. 25, 2012 and is incorporated herein by reference in its entirety.

TECHNICAL FIELD

The present disclosure is generally related to the field of data transmission and data coding, for example, in a wireless communications system.

BACKGROUND

Communications systems, including wireless communications systems, typically communicate through non-ideal channels. For example, conditions such as electromagnetic interference, signal degradation, phase delays, component mismatches, fading, and other circuit and/or environmental non-idealities may attenuate or distort a communications signal or may otherwise interfere with the communications capabilities of the system. Moreover, compensating for these and other channel non-idealities is complicated by the dynamic variation that is often associated with many of these factors.

Communications systems may employ link adaptation technologies to adjust communications parameters based on variations of communications channel condition values. For example, link adaptation may be employed in conjunction with many wired and/or wireless communications systems or standards such as Universal Mobile Telecommunications System (UMTS), Long Term Evolution (LTE), Enhanced Data GSM Environment (EDGE), Digital Subscriber Line (DSL), Data Over Cable Service Interface Specification (DOCSIS), proprietary systems or protocols, and/or the like.

In these and other systems, link adaptation may be employed to adjust parameters such as transmitter output power, receiver input sensitivity, strength of channel coding, symbol rate, allocated spectrum, modulation type, and/or the like in response to channel condition values. In one example, link adaptation is employed to increase the strength of channel coding when communicating through a relatively noisy channel and to decrease the strength of channel coding when communicating through a relatively noise free channel. In this example, the strength of the channel coding may be adjusted to balance the transmission rate of payload data with the ability of the receiver to recover the payload data from the non-ideal channel. In such a manner, link adaptation may be employed to improve the throughput of payload data over a wide range of channel conditions.

Additional details regarding link adaptation may be as described by the 3rd Generation Partnership Project (3GPP) technical specification (TS), which is hereby incorporated by reference. For example, TS 25.212, TS 25.308, and TS 25.321 provide additional details regarding link adaptation.

BRIEF DESCRIPTION OF THE DRAWINGS

FIG. 4 illustrates an example of an error rate table.

DETAILED DESCRIPTION

Overview

Figure 1:
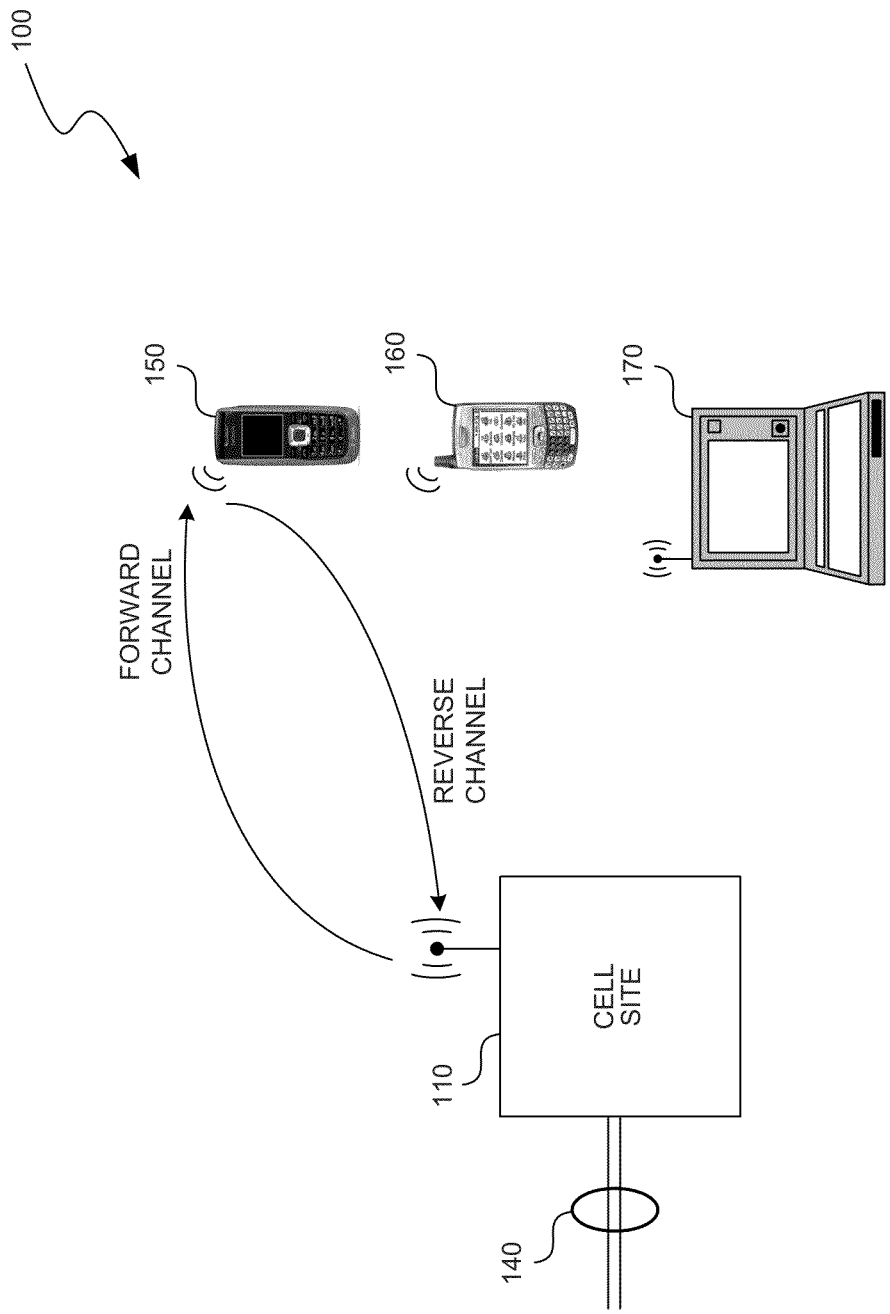
FIG. 1 is a diagram of a suitable environment for practicing the invention.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Technology for performing link adaptation in a communications system is described. The technology may employ an error rate table that has a channel condition value dimension and a transmission parameter dimension. For example, the error rate table may be a memory based table and/or predictive in nature. For example, the error rate table may be employed to enable predictive determination of expected throughputs for given channel conditions. The elements of the error rate table may include expected error rates for data transmitted at various channel conditions according to various transmission parameters. Also, the various transmission parameters may each be associated with a data transmission rate.

For a given channel condition value, the methods may determine expected throughputs for each of the transmission parameters according to the associated expected error rates and data transmission rates. A transmission parameter may be selected according to the expected throughputs.

As a non-limiting example, the technology may be employed to perform link adaptation in a wireless communications system to adapt a communications link to current channel conditions of a variable condition channel. The technology may also be employed to optimize throughputs, data recoverability, and/or other performance characteristics of the communications system. Further, increases in communications system memory resources may enable implementation of the technology to provide link adaptation superior to conventional link adaptation methods and algorithms.

As another example, the technology may be employed with High Speed Downlink Packet Access (HSDPA) or High Speed Uplink Packet Access (HSUPA) systems to select a transport block size (TBS) value according to a determined channel quality indicator (CQI). In such an environment, each TBS value may also be associated with a payload data size as well as a forward error correction (FEC) code strength for each transmitted data block. In this example, the technology enables the likelihood of successful payload data recovery for a particular transmission to be balanced with the size of the payload data. For example, feedback and/or memory of outcomes for transmissions at various TBS values may be stored in an error rate table and employed to select TBS values. Accordingly, data may be transmitted with the TBS value expected to provide the highest throughput.

This Detailed Description describes illustrative environments in which the invention may be practiced, illustrative diagrams of a communications system, and illustrative logical flow diagrams for practicing the invention.

Illustrative Environments

FIG. 1 is a diagram of environment 100 in which the invention may be practiced. As shown, environment 100 includes cell site 110, and mobile devices 150-170. Cell site 110 is coupled to backend interface 140. Cell site 110 and mobile devices 150-170 are configured to communicate with each other over a wireless communications link.

Cell site 110 may include virtually any device for facilitating wireless network access. For example, cell site 110 may be a wireless telephony base station, a wireless network access base station, a wireless email base station, and/or the like. As an example, cell site 110 may be operated by a mobile telephony service provider. Generally, cell site 110 is configured to provide a network interface for mobile devices 150-170 by providing an interface (via an antenna) between mobile devices 150-170 and backend interface 140. Cell site 110 and mobile devices 150-170 may communicate using any wireless protocol or standard. These include, for example, Global System for Mobile Communications (GSM), Time Division Multiple Access (TDMA), Code Division Multiple Access (CDMA), Orthogonal Frequency Division Multiplexing (OFDM), General Packet Radio Service (GPRS), EDGE, Advanced Mobile Phone System (AMPS), Worldwide Interoperability for Microwave Access (WiMAX), UMTS, Evolution-Data Optimized (EVDO), LTE, Ultra Mobile Broadband (UMB), and/or the like.

Backend interface 140 may provide a network connection to cell site 110. For example, backend interface 140 may include one or more T-1 connections, T-3 connections, OC-3 connections, frame relay connections, Asynchronous Transfer Mode (ATM) connections, microwave connections, Ethernet connections, and/or the like. In addition, backend interface 140 may provide an interface to a telephone switch (e.g., to a 5ESS switch, a Private Branch Exchange switch, a base station controller, etc.), to a data network (e.g., to a router, network switch, a Radio Network Controller (RNC)), and/or the like.

Cell site 110 may also include an antenna to facilitate communications with mobile devices 150-170 over an air interface channel. Such an antenna may include any type of suitable antenna. For example, omnidirectional antennas, lossy transmission lines, beam steerable antennas, variable gain antennas, and/or the like may be employed as appropriate. Cell site 110 may also include a preamplifier (not shown) to preamplify received signals and/or be coupled to any number of antennas. For example, a typical cell site may provide coverage to three sectors of approximately 120° each with one or more antennas providing coverage to each sector. However, in other systems, any other number of antennas and/or sectors may be employed.

As one example, an air interface channel may include a forward channel and a reverse channel. In one system, downlink transmissions, responses to uplink transmissions (e.g., acknowledgements (ACKs)/negative acknowledgements (NACKs)), control communications, channel condition data or values, and/or the like may be communicated over the forward channel. Likewise, uplink transmissions, responses to downlink transmissions, control communications, channel condition data or values, and/or the like may be communicated over the reverse channel.

Also, a picocell may be communicatively coupled to cell site 110 or employed instead of cell site 110. For example, a picocell may be a wireless access point typically covering a relatively small area, such as within a building (e.g., home, office, shopping mall, train station, or the like) or within an aircraft, ship, train or other vehicle. A picocell may, for example, be analogous to a WiFi access point, except that it typically communicates over licensed spectrum of an associated wireless carrier. A picocell may serve as an access point for routing communication between mobile devices 150-170 and other network devices. One or more picocells may be coupled to cell site 110 or other network elements by way of a wired or wireless connection. It will be appreciated by those skilled in the relevant art that picocell implementations of the invention are within the scope of aspects of the invention disclosed herein.

Likewise, Internet Protocol (IP) based network implementations of the invention are also within the scope of aspects of the invention disclosed herein. Such IP-based network implementations may take the form of a Voice over Internet Protocol (VoIP) broadcast architecture, Unlicensed Mobile Access (UMA) or Generic Access Network (GAN) broadcast architecture, or a femtocell broadcast architecture. As used herein, VoIP is a telecommunication system for the transmission of voice over the Internet or other packet-switched networks, UMA is the commercial name of the 3GPP Generic Access Network or GAN standard. Somewhat like VoIP, UMA/GAN is a telecommunication system which extends services, voice, data, and IP Multimedia Subsystem/Session Initiation Protocol (IMS/SIP) applications over IP-based networks. For example, a common application of UMA/GAN is in a dual-mode handset service in which device users can seamlessly roam and handover between local area networks and wide area networks using a GSM/WiFi dual-mode mobile phone. UMA/GAN enables the convergence of mobile, fixed and Internet telephony, sometimes called Fixed Mobile Convergence. Femtocells, much like picocells, may communicate within the licensed spectrum of a wireless carrier. Femtocells may be, for example, designed for use in residential or small business environments. Femtocells may also connect to the service provider's network much like UMA/GAN access points, namely over IP-based networks.

Mobile devices 150-170 may include virtually any devices for communicating over a wireless network. For example, mobile devices 150-170 may include mobile telephones (e.g., cellular telephones, GSM telephones, TDMA telephones, LTE telephones, etc.), wireless data devices (e.g., Personal Digital Assistants (PDAs), computers, pagers, etc.), and/or the like. Mobile devices 150-170 may also be configured to receive data from cell site 110 and provide a response to cell site 110 to indicate successful and/or unsuccessful reception of the received data. For example, mobile devices 150-170 may be configured to receive encoded data from cell site 110, decode or attempt to decode the data, and provide a response (e.g., ACK/NACK) to cell site 110 to indicate whether the data was successfully decoded.

As one example, the invention may be practiced to facilitate communications between cell site 110 and mobile devices 150-170 over the air interface channel. For example, cell site 110 may employ error rate data to determine a transmission parameter for data transmission. Such error rate data may include a channel condition value dimension as well as a transmission parameter dimension and may be stored in an error rate table, error rate array, other data structure, and/or the like ("error rate table"). Cell site 110 may determine the channel condition to mobile devices 150-170 and then determine a transmission parameter based on the channel condition value and the error rate data. Also, cell site 110 may select the transmission parameter expected to provide the highest expected throughput. Also, cell site 110 may be configured to update/maintain the error rate table based on transmitted blocks. Further details regarding error rate tables are provided below.

However, in other example, other devices may be employed to determine a channel condition, determine the transmission parameter, and/or employ an error rate table. For instance, such functionality may be implemented by mobile devices 150-170, a RNC, a switch, and/or the like.

In this example, the channel condition value may be quantified by a CQI value or a carrier to interference ratio (C/I). However, in other examples, a signal to noise ratio (SNR), a received signal strength indicator (RSSI) value, a bit error rate (BER), a frame error rate (FER), and/or the like may also be suitably employed. Likewise, the transmission parameter may correspond to a TBS value, a channel coding and/or FEC code strength, a radio frequency (RF) level, a modulation type, and/or the like. The error rate data may represent a bit error rate (BER), a frame error rate (FER), a ratio of NACKs to ACKs, a ratio of successfully decoded data blocks to transmitted data blocks, and/or the like.

In an example UMTS environment, each TBS value may correspond to a number of bits of payload data in a transport block, where the number of bits in the transport block may also be inversely related to a channel coding or forward error correction (FEC) code strength of the transport block. In this example, when cell site 110 and a mobile device communicate over a favorable channel (e.g., having a high CQI), cell site 110 may select a transmission parameter that provides a relatively high data transmission rate (e.g., large TBS value). However, if the channel between cell site 110 and another mobile device is less favorable (e.g., lower CQI), cell site 110 may select a transmission parameter that provides a lower data transmission rate (e.g., smaller TBS value). Cell site 110 may also select a transmission parameter to balance the data transmission rate with the likelihood of successful data reception. Accordingly, link adaptation may be performed to select a transmission parameter that optimizes throughput between cell site 110 and each of mobile devices 150-170. However, as discussed above, other devices may be employed to select transmission parameters.

In other UMTS or non-UMTS environments other channel condition values and/or transmission parameters, such as those discussed above, may be employed. For example, transmission parameters may also represent modulation types such as Quadrature Phase Shift Keying (QPSK), 16 Quadrature Amplitude Modulation (16 QAM), Frequency Modulation (FM), OFDM modulation, wavelet modulation, and/or the like. In such an example, a communications system may employ lower order modulation during less favorable channel conditions and higher order modulation during more favorable channel conditions.

Likewise, combinations of the various transmission parameter types may be combined. For example, low order modulation (e.g., QPSK) may be employed with relatively low TBS values while higher order modulation (e.g., 16 QAM) may be employed with higher TBS values.

Also, this link adaptation may be performed for the uplink, for the downlink, or for both the uplink and the downlink of a bidirectional communications system. However, in one example, only downlink link adaptation is performed.

One skilled in the art will appreciate that although illustrated in the context of a wireless telecommunications environment, the described technology may be practiced in any other communications system or environment. For example, the described technology may be practiced in other wireless communications systems, wired communications system, optical communications systems, and/or the like.

Illustrative Communications System

Figure 2:
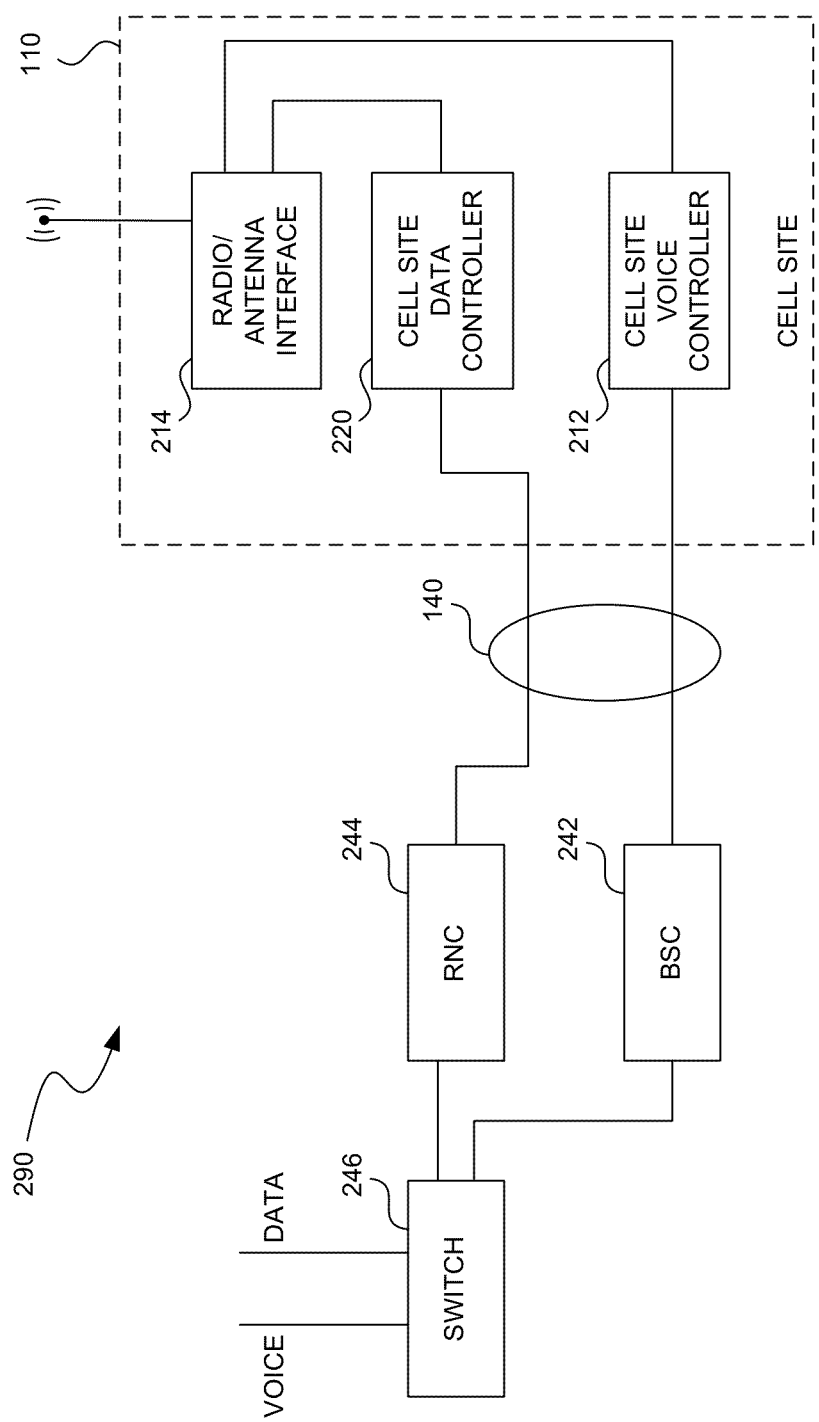
FIG. 2 is a diagram of a communications system in which the invention may be practiced.

FIG. 2 is a block diagram of communications system 290. Communications system 290 includes cell site 110, Base Station Controller (BSC) 242, RNC 244, and switch 246. Cell site 110 includes cell site voice controller 212, cell site data controller 220, and radio/antenna interface 214. Although elements of communications system 290 are illustrated as elements of a GSM/UMTS communications system, the invention is not limited to GSM/UMTS communications systems. For example, the invention may also be practiced in an LTE and/or other fourth generation wireless environment.

Switch 246 may be coupled to BSC 242 and RNC 244. For example, switch 246 may be configured to switch voice traffic from one or more BSCs to a public switched telephone network (PSTN) or to a telephone switch such as a 5ESS switch, a Private Branch Exchange switch, and/or the like via signal VOICE. Likewise, switch 246 may be further configured to switch data from one or more RNCs to a data network, to a router, to a switch, and/or the like via signal DATA. Also, switch 246 may include a mobile switching center (MSC), a media gateway, a call gateway, and/or the like.

BSC 242 may be coupled between switch 246 and cell site 110 to control certain operational aspects of cell site voice controller 212 of cell site 110. For example, BSC 242 may be configured to control handoffs, network registration for mobile devices, channel allocation, radio transmitter output power, and/or the like. BSC 242 may be employed to control voice functionality of any number of cell sites.

RNC 244 may be coupled between switch 246 and cell site 110 to control certain operational aspects of cell site data controller 220 of cell site 110. Also, RNC 244 may be employed to control any number of cell site data controllers. As an example, RNC 244 may be a UMTS counterpart of BSC 242.

As stated above, cell site 110 may include cell site voice controller 212, cell site data controller 220, and radio/antenna interface 214. In typical communications systems, cell site voice controller 212 and cell site data controller 220 are configured to provide a low-level radio or air interface to mobile devices under the control of BSC 242 and RNC 244. In one environment, cell site voice controller 212 may be a GSM base station (BS) and cell site data controller 220 may be a UMTS Node-B. In such an environment, cell site voice controller 212 may provide low-level GSM radio interfacing while cell site data controller 220 provides low-level UMTS radio interfacing, fast scheduling, and link adaptation based on channel conditions and error rate data, as discussed above. However, fast scheduling and link adaptation may be provided by or at other elements and/or devices. However, cell site 110 may include limited command and control functionality or no command and control functionality. Instead, BSC 242 and/or RNC 244 may provide such functionality while cell site 110 merely provides a physical layer interface to associated mobile devices.

Cell site 110 may also include radio/antenna interface 214 to provide an interface between cell site voice controller 212, cell site data controller 220, and one or more antennas. Radio/antenna interface 214 may include radio frequency (RF) transmitters, receivers, and a smart bias tee that is configured to physically interface the RF signals between cell site voice controller 212, cell site data controller 220, and the one or more antennas. For example, an RF transmitter may be configured to transmit data through a communications channel to a mobile device, and an RF receiver may be configured to receive data from a mobile device. In addition, the received data may include responses to transmitted data, e.g., ACKs and/or NACKs.

In other examples, the RF transmitters and/or receivers may alternatively be integrated with cell site voice controller 212 and/or cell site data controller 220 instead of being integrated with radio/antenna interface 214.

Figure 3:
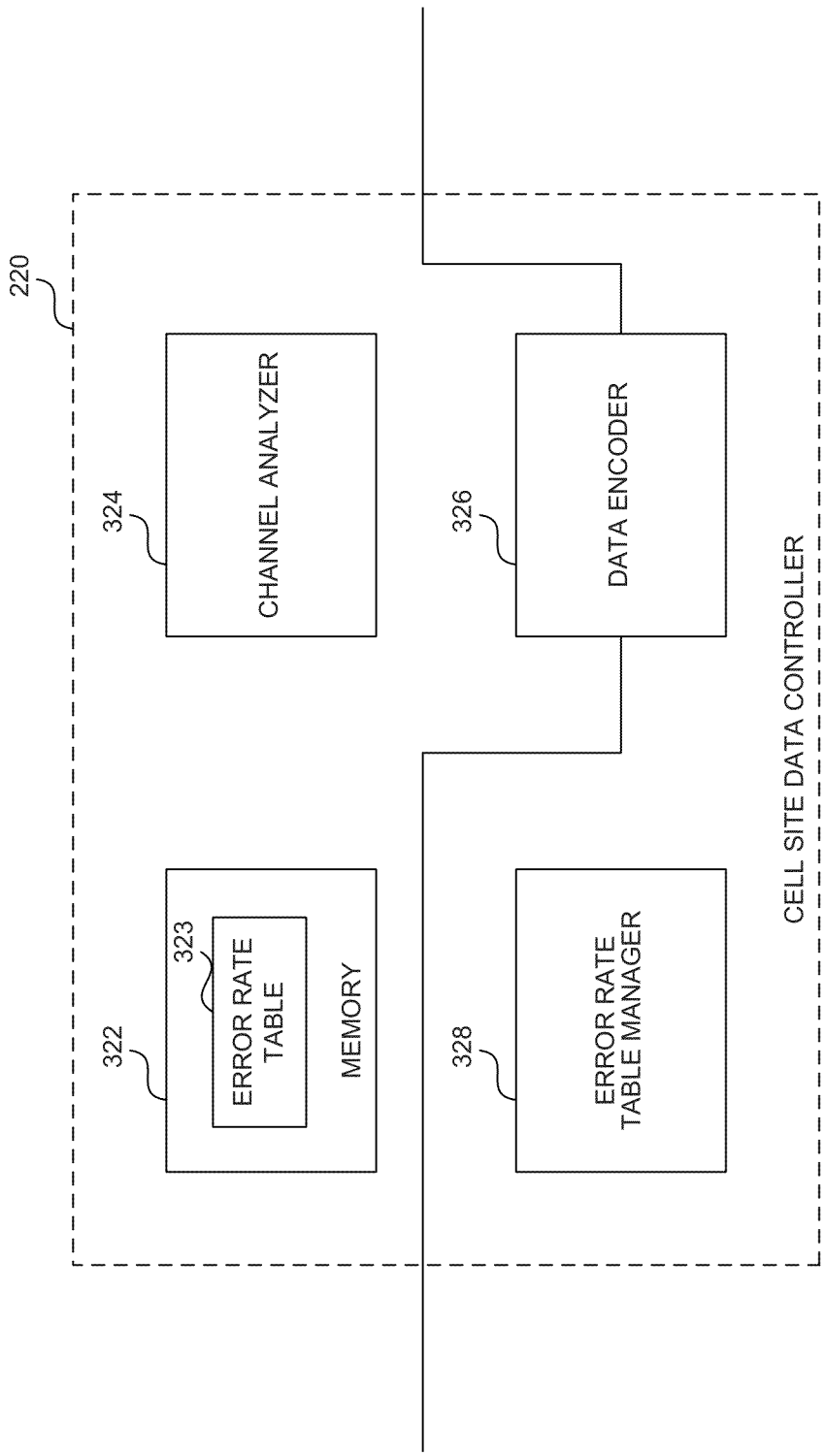
FIG. 3 is a block diagram of a cell site data controller usable in the cell site of FIG. 2.

FIG. 3 is a block diagram of cell site data controller 220. Cell site data controller 220 includes memory 322, channel analyzer 324, data encoder 326, and error rate table manager 328. Memory 322 includes error rate table 323. As discussed above, cell site data controller 220 may be configured to provide low level mobile device data interfacing, fast scheduling, and link adaptation.

Memory 322 may be provided to store instructions and/or other data employed by cell site data controller 220. In one example of cell site data controller 220, memory 322 includes error rate table 323, a basic input/output system (BIOS), and application code.

As one example, error rate table 323 may be a memory based table and/or predictive in nature. Also, error rate table 323 may have a channel condition value dimension and a transmission parameter dimension, as noted above. Each dimension of error rate table 323 may include multiple values/parameters such that error rate table 323 includes at least four elements (e.g., the possible combinations when two channel condition values and two transmission parameters are employed) with each of the elements corresponding to a channel condition value/transmission parameter combination. Each of these elements may include, for example, an expected error rate, past error rate, other error rate, and/or the like for data transmitted through a communications channel of the corresponding channel condition value and according to the corresponding transmission parameter. In addition, each element may also include additional data (e.g., a number of transmitted data blocks, a number of ACKs, a number of NACKs, and/or the like and combinations thereof).

Further, each of the transmission parameters may be associated with an estimated or actual data transmission rate (e.g., number of bits, bit rate, frame rate, etc.). Accordingly, throughput may be determined as a function of the error rate and the data transmission rate, for example, by data encoder 326, as discussed below. One example of a suitable error rate table is illustrated below by FIG. 4.

Channel analyzer 324 may be configured to determine a condition of the communications channel (e.g., channel quality, signal strength, fading, etc.) and to select one of the channel condition values from the channel condition value dimension of error rate table 323 according to the condition of the communications channel. For example, channel analyzer 324 may be configured to select the channel condition value according to a current, past, or predicted quality of the communications channel. Also, channel analyzer 324 may determine a CQI according to a SNR, BER, FER, and/or the like. Likewise, channel analyzer 324 may be adapted to receive CQI information from a mobile device or may be integrated within a mobile device. However, any other suitable channel analyzers may be employed.

Data encoder 326 may be configured to determine the transmission parameter for data transmission and to encode and/or transmit data according to the determined transmission parameter. For example, data encoder 326 may analyze error rate table 323 to determine the expected error rates for each channel condition value/transmission parameter combination having the channel condition value selected by channel analyzer 324. Data encoder 326 may then calculate expected throughput for each transmission parameter according to these expected error rates and estimated or actual data transmission rates for each transmission parameter. For example, the expected throughput may be calculated as $(1-Er)*Tr$, where Er is an expected error rate and Tr is the estimated or actual transmission rate. With this example, the error rate may be a percentage of transmission blocks expected to be unrecoverable or received with uncorrectable errors.

Data encoder 326 may also be configured to select the transmission parameter according to the expected throughput. For example, data encoder 326 may be configured to select the transmission parameter corresponding to the highest calculated expected throughput. Data encoder 326 may then encode and/or transmit data according to the selected transmission parameter.

Error rate table manager 328 may be provided to initialize, update, maintain, and/or provide error rate table 323. In at least one system, error rate table manager 328 is a real-time or near real-time system or process. However, other error rate table managers may include non-real-time systems or processes.

As one example, error rate table manager 328 may be configured to initialize error rate table 323. Initialization may include initializing error rate table 323 with zeros, ones, and/or estimated error rates. For example, estimated error rates may be based on simulation data for a variety of channel conditions/transmission parameter combinations. As another example, estimated error rates may also include experimental or test data (e.g., for a particular specific region, rural regions, urban regions, for a specific cell site, etc.). As yet another example, cell site data controller 220 may be configured to transmit a training sequence to a mobile device as part of an initialization sequence for error rate table 323. For example, a suitable training sequence may include blocks transmitted over a variety of channel conditions and with a variety of transmission parameters. However, as discussed below, a training sequence is not required as error rate table 323 may quickly converge during operation.

In addition, error rate table manager 328 may also be configured to update and/or maintain error rate table 323 based on ongoing communications. For example, error rate table manager 328 may receive indications of whether transmitted blocks are successfully received (e.g., an ACK or NACK). Based on this indication, error rate table manager 328 may update the error rate element of the corresponding channel condition value/transmission parameter combination (e.g., lower the corresponding error rate element as NACKs are received). However, error rate table manager 328 may also update corresponding error rate elements of error rate table 323 according to a ratio of ACKs to transmitted blocks, a ratio of NACKs to transmitted blocks, and/or the like.

In one example, blocks are transmitted every two milliseconds (e.g., a transmission time interval (TTI) of two milliseconds) and an ACK or NACK should be received a few milliseconds after each transmission. In such a system, the described link adaptation will update error rate table 323 with 500 indications a second. Accordingly, the expected error rates for a current channel condition will quickly converge and enable efficient optimization of throughput even with dynamic channel conditions.

In addition, error rate table manager 328 may be further configured to manage moving averages for the error rates of error rate table 323. For example, moving averages may be employed due to dynamic channel conditions that may render old indications irrelevant to current channel conditions. In one environment, moving averages may be calculated such that the most recent number of N samples are employed to calculate an error rate for each error rate element. For example, as each additional value for channel condition/transmission parameter is acquired, the oldest sample is discarded and the additional value is stored. The error rate element may then be recalculated.

However, a moving average may also be calculated for a time period, e.g., a 10- to 30-second window time frame. However, any other suitable time frame may be employed. In another example, error rate table manager 328 is configured to dynamically adjust a moving average time frame according to mobile device conditions. For example, a shorter timeframe may be employed with a fast-moving mobile device while a longer time frame may be employed with a relatively immobile mobile device.

FIG. 4 is an illustration of an example of error rate table 323. As shown, error rate table 323 includes channel condition value dimension 410, transmission parameter dimension 420, and error rate elements 430. Channel condition value dimension 410 includes channel condition values 412, and transmission parameter dimension 420 includes transmission parameters 422. As shown, each of error rate elements 430 corresponds to a channel condition value and a transmission parameter. FIG. 4 is provided merely to illustrate a possible example of an error rate table 323.

In this example, the "0.01" values may represent initialization values for channel condition/transmission parameter combinations for which no empirical data is available. However, for other examples, a "0.00," "1.00," or any other suitable value may be employed as initialization values. Likewise, the values, parameters, and error rate data of FIG. 4 do not necessarily represent actual values, parameters, and error rate data. However, in real-world operations, a diagonal set of error rate elements 430 may be most likely to converge (e.g., to cause use of large TBS values at high CQI conditions and small TBS values at low CQI conditions). Initializing, updating, maintaining, and/or providing error rate table 323 may be as discussed above in reference to error rate table manager 328.

As one example, channel condition values 412 may correspond to CQI values, transmission parameters 422 may correspond to TBS values, and error rate elements 430 may represent percentage likelihoods (e.g., probability values) that a block transmitted into a channel of a corresponding CQI with a corresponding TBS will be recovered. With this example, an expected throughput is (TBS * PI), where TBS is the number of bits in a block and PI is the percentage likelihood of block recovery for the corresponding channel condition value/transmission parameter combination. For example, at a CQI of 14, the expected throughput for a 2046 bit TBS is 2005 bits, the expected throughput for a 2404 bit TBS is 2236 bits, and the expected throughput for a 2726 bit TBS is 2208 bits. With this example, a TBS of 2404 may be selected to optimize the expected throughput. Also, if all transmission parameters are the same or uninitialized for a given channel condition value, a data encoder may be configured to select a transmission parameter according to a tie-breaking mechanism. For example, the data encoder may select the transmission parameter with the highest associated data transmission rate.

As another example, each of error rate elements 430 may represent discount values (e.g., the likelihood that a transport block of a corresponding transmission parameter transmitted into a channel of a corresponding channel condition value will be unrecoverable or received with uncorrectable errors) for its corresponding channel condition value/transmission parameter combination. Likewise, each of error rate elements 430 may include counters such as ACK counters, NACK counters, transmitted block counters, and/or the like, and combinations thereof, for each channel condition value/transmission parameter combination. These counters may be operated upon to provide probability values or discount values (e.g., divide ACK counters by transmitted block counters to calculate probability values) for its channel condition value/transmission parameter combination. Further details regarding such counters are discussed below in reference to FIG. 5.

Illustrative Logical Flow Diagrams

Figure 5:
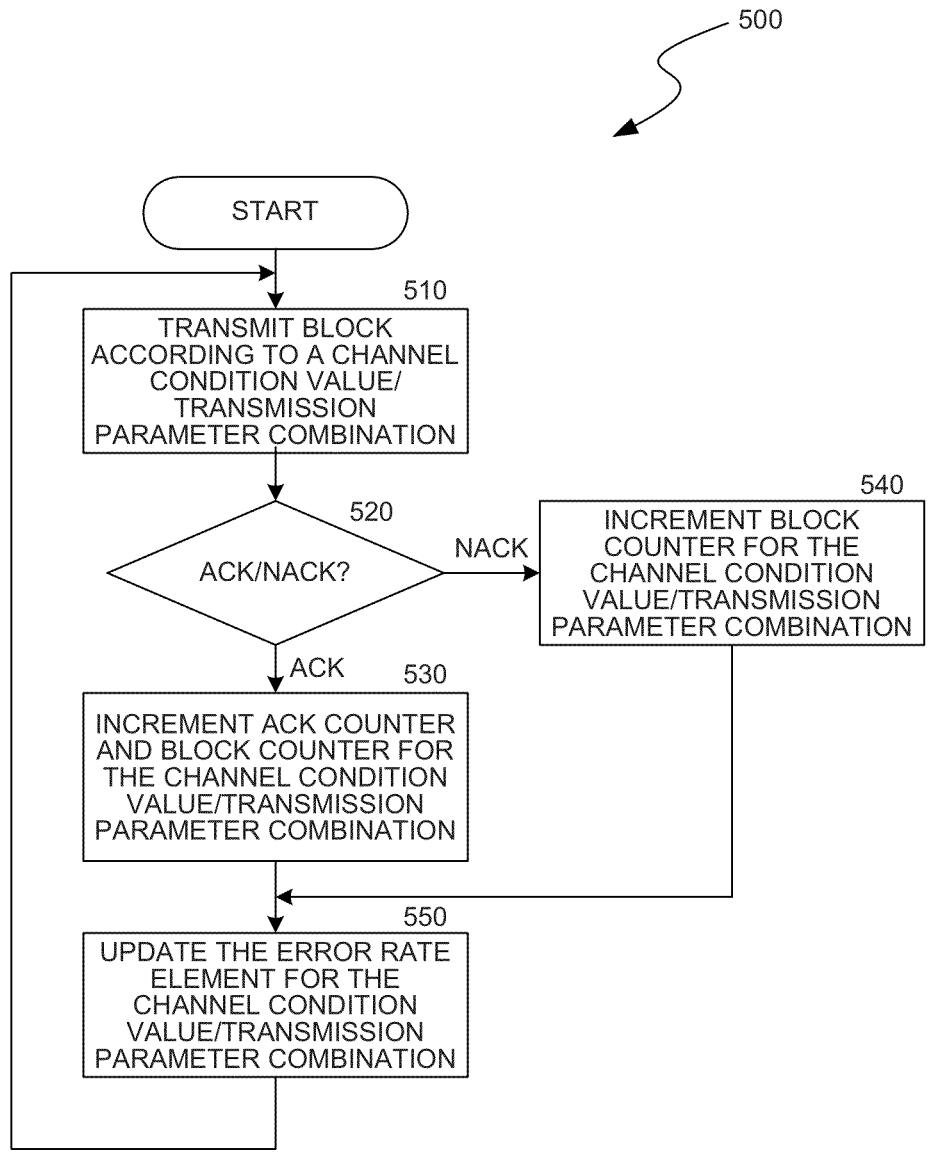
FIG. 5 is a logical flow diagram of a process for updating an error rate table.

FIG. 5 is a logical flow diagram of process 500 for updating an error rate table.

Flowing from a start block, processing begins at step 510 where data encoder 326 transmits a block with a channel condition value/transmission parameter combination. As one example, the channel condition value/transmission parameter combination of step 510 is selected by steps 620 and 630 of process 600, as discussed below. Processing then flows to step 520.

At decision block 520, error rate table manager 328 determines if an ACK or a NACK is received in response to the transmitted block. For example, an ACK may be transmitted by a mobile device upon receiving and successfully decoding a block from cell site 110. Likewise, a NACK may be transmitted by the mobile device upon receiving a block that it is unable to decode. In one example, a lack of response is considered a NACK.

If an ACK is received at decision block 520, processing flows to step 530 where error rate table manager 328 increments an ACK counter and a block counter for the channel condition value/transmission parameter combination of step 510. However, if a NACK is received at decision block 520, processing flows to step 540 where error rate table manager 328 increments the block counter for the channel condition value/transmission parameter combination of step 510 without incrementing corresponding ACK counter. Accordingly, the ratio of the count on the ACK counter to the count of the block counter approximates a percentage of successfully received blocks to transmitted blocks for the channel condition value/transmission parameter combination.

From either step 530 or 540, processing flows to step 550 where error rate table manager 328 updates the error rate element 430 of the channel condition value/transmission parameter combination of step 510. Error rate table manager 328 may update the corresponding error rate element 430 by dividing the corresponding ACK counter by the corresponding block counter. Processing then returns to block 510.

Figure 6:
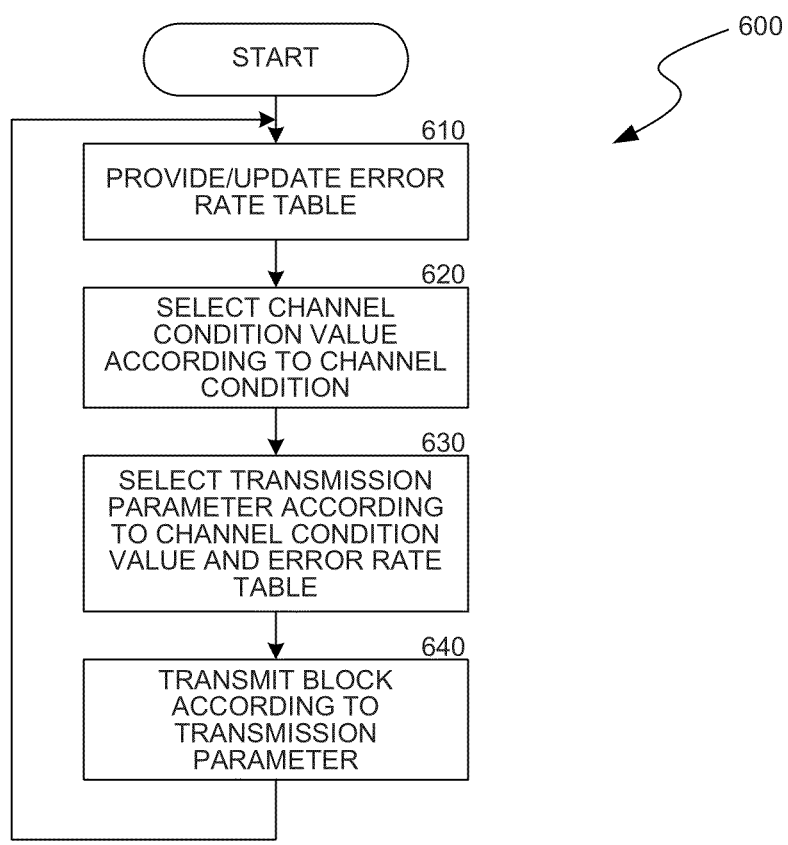
FIG. 6 is a logical flow diagram of a link adaptation process.

FIG. 6 is a logical flow diagram of process 600 for link adaptation in a communications system.

Flowing from a start block, processing begins at step 610 where cell site data controller 220 provides and/or updates error rate table 323. For example, error rate table manager 328 may be employed to initialize, update, maintain, or otherwise provide error rate table 323. As discussed above, error rate table 323 may be employed to provide dynamic link adaptation and to optimize throughput over varying channel conditions. In addition, use of error rate table 323 may enable improved spectral efficiency of between ten percent to 100 percent as compared to other link adaptation systems, methods, and/or algorithms.

From step 610, processing flows to step 620 where channel analyzer 324 selects a channel condition value based on a current channel condition. Channel analyzer 324 may select a channel condition value that best approximates and/or represents a current state of a communications channel between a cell site and mobile device. As one example, channel analyzer 324 selects a CQI value as the channel condition value based on measured or reported values from a mobile device.

From step 620, processing flows to step 630 where data encoder 326 selects a transmission parameter according to the channel condition value and error rate table 323. As discussed above, data encoder 326 may select a transmission parameter from transmission parameter dimension 420 to optimize the expected throughput by calculating expected throughput for each transmission parameter given a channel condition value and selecting the transmission parameter corresponding to the highest or "best" expected throughput. Processing then flows to step 640.

At step 640, data encoder 326 then transmits a block according to the selected transmission parameter. Information regarding reception of this block may be employed to update error rate table 323 as processing returns to step 610.

As described herein, processes 500 and 600 may be implemented in software, in hardware, or in a combination of hardware and software. As such, the operations illustrated as blocks in FIGS. 5 and 6 may respectively represent processor-executable instructions that, when executed, perform link adaptation or direct the updating of an error rate table. For clarity, processes 500 and 600 are described below as being performed by particular elements of FIGS. 1-4. However, processes 500 and/or 600 may also be, for example, performed by other processors, by other elements, or in other systems whether or not such processors, elements, or systems are described herein. In addition, processes 500 and/or 600 may be stored in non-volatile memory. Likewise, processes 500 and/or 600 may be a real-time, near real-time, or non-real-time processes.

Conclusion

Unless the context clearly requires otherwise, throughout the description and the claims, the words "comprise," "having," "include," and the like, and conjugates thereof, are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using singular or plural reference may also include plural or singular reference, respectively. The word "or," in reference to a list of two or more items, covers all of the following interpretations of the word: any of the items in the list, all of the items in the list, and any combination of the items in the list. The term "based on" is not exclusive and is equivalent to the term "based, at least in part, on" and includes being based on additional factors, whether or not the additional factors are described herein. The terms "table," "array," "data structure," and similar, and elements thereof, refer to a logical collection of data regardless of the actual data organization, structure, or storage.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

Any patents and applications and other references noted above, including any that may be listed in accompanying filing papers, are incorporated herein by reference. While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a processor-readable medium. (Any claims intended to be treated under 35 U.S.C. §112, ¶6 will begin with the words "means for". Use of the term "for" in any other context is not intended to invoke treatment under 35 U.S.C. §112, ¶6.) Accordingly, the applicant reserves the right to add additional claims after filing the application to pursue such additional claim forms for other aspects of the invention

I claim:

1. A method of link adaptation in a communications network, comprising:
    maintaining an error rate array in a storage component,
        wherein the error rate array has at least a channel condition value and a transmission parameter,
        wherein the transmission parameter is a set of transmission parameters corresponding to data transmission capabilities of the communications network, and
        wherein each element of the error rate array corresponds to an error rate of a channel condition value/transmission parameter combination;
    selecting at least one element of the error rate array corresponding to a current condition of a communications channel;
    selecting an individual transmission parameter of the set of transmission parameters,
        wherein the individual transmission parameter is selected based on the selected at least one element of the error rate array; and,
    transmitting data according to the selected individual transmission parameter.

2. The method of claim 1, wherein each of the transmission parameters is associated with an estimated or actual throughput.

3. The method of claim 1, wherein selecting the individual transmission parameter includes:
    determining expected throughputs for each of the transmission parameters according to expected error rates of data transmitted at the selected channel condition value; and
    selecting the individual transmission parameter according to the determined expected throughputs.

4. The method of claim 1, wherein selecting the individual transmission parameter includes:
    calculating expected throughputs for each of the transmission parameters as a function of an error rate of the corresponding transmission parameter and a data transmission rate of the corresponding transmission parameter; and selecting the individual transmission parameter corresponding to the highest calculated expected throughput.

5. The method of claim 1, wherein maintaining the error rate array includes:
initializing the elements according to simulated data;
adjusting, in substantially real-time, the elements by:
transmitting data blocks at multiple channel condition values according to multiple transmission parameters; and
determining whether the transmitted data blocks are successfully received by a recipient; and
calculating moving averages of the adjusted elements.

6. The method of claim 1, wherein the channel condition value is represented by at least one of a channel quality indicator (CQI) value, a signal to noise ratio (SNR), a carrier to interference ratio (C/I) value, a bit error rate (BER), a frame error rate (FER), or a received signal strength indicator (RSSI) value.

7. The method of claim 1, wherein the transmission parameter corresponds to at least one of a transport block size (TBS) value, a radio frequency (RF) level, or a modulation type.

8. The method of claim 1, wherein the transmission parameter represents a data payload size of a data block and a forward error correction (FEC) code strength of the data block.

9. The method of claim 1, wherein the error rate represents at least one of a bit error rate (BER), a frame error rate (FER), or a ratio of negative acknowledgements (NACKs) to acknowledgements (ACKs).

10. The method of claim 1, wherein the method is employed in a Long Term Evolution (LTE) or Universal Mobile Telecommunications System (UMTS) communications system.

11. The method of claim 1, wherein the method is employed with both an uplink and a downlink of a bidirectional communications system.

12. The method of claim 1, wherein the method is employed to transmit data via High Speed Downlink Packet Access (HSDPA) or High Speed Uplink Packet Access (HSUPA), or wherein the method further includes modulating data with at least one of Quadrature Phase Shift Keying (QPSK) or 16 Quadrature Amplitude Modulation (16 QAM).

13. A tangible processor-readable medium for executing a method of link adaptation in a wireless communications system, the method comprising:
determining, for each channel condition value in a set of multiple channel condition values, an error rate for each transmission parameter in a set of multiple transmission parameters, wherein each channel condition value corresponds to one set of multiple transmission parameters;
storing the determined error rates in an error rate table;
selecting a channel condition value/transmission parameter combination according to a condition of a communications channel and the determined error rates; and
transmitting first data according to the error rate of the selected channel condition value/transmission parameter combination;
calculating a new error rate based at least in part on a result of a data transmission;
updating an element of the error rate table based on the calculated new error rate; and
transmitting second data based on the updated error rate table.

14. The tangible processor-readable medium of claim 13, wherein selecting the individual channel condition value/transmission parameter combination includes:
selecting a channel condition value according to a current quality of the communications channel between a transmitter and a receiver;
determining expected throughputs for each of the transmission parameters in the transmission parameter set of the selected channel condition value according to the error rates of the transmission parameters in the transmission parameter set of the selected channel condition value; and
selecting the individual transmission parameter according to the determined expected throughputs.

15. The tangible processor-readable medium of claim 13, wherein the channel condition value is represented by at least one of a channel quality indicator (CQI) value, a signal to noise ratio (SNR), a carrier to interference ratio (C/I) value, or a received signal strength indicator (RSSI) value, wherein the transmission parameter corresponds to at least one of a transport block size (TBS) value, a radio frequency (RF) level, a modulation type, or a data payload size of a data block and a forward error correction (FEC) strength of the data block, and wherein the error rate represents at least one of a bit error rate (BER), a frame error rate (FER), or a ratio of negative acknowledgements (NACKs) to acknowledgements (ACKs).

16. The tangible processor-readable medium of claim 13, wherein the tangible processor-readable medium is installed in a Long Term Evolution (LTE) or Universal Mobile Telecommunications System (UMTS) communications system device.

17. The tangible processor-readable medium of claim 13, wherein the method is employed to transmit data via High Speed Downlink Packet Access (HSDPA) or High Speed Uplink Packet Access (HSUPA), or wherein the method further includes modulating data with at least one of Quadrature Phase Shift Keying (QPSK) or 16 Quadrature Amplitude Modulation (16 QAM).

18. An apparatus for link adaptation in a communications network, comprising:
a memory configured to store an error rate table having a channel condition value and a transmission parameter, wherein the channel condition value is a set of channel condition values,
wherein the transmission parameter is a set of transmission parameters corresponding to data transmission capabilities of the communications network;
a channel analyzer configured to determine a current channel condition value based on received information reflecting a condition of a communications channel; and
a data encoder configured to select an individual transmission parameter of the transmission parameter according to the error rate table and the current channel condition value,
wherein selecting the individual transmission parameter includes determining a data element of the error rate table corresponding to the current channel condition value and selecting a transmission parameter based on the determined data element.

19. The apparatus of claim 18, wherein the data encoder is further configured to calculate expected throughputs for each of the transmission parameters according to the expected error rates for data transmitted at the selected channel condition value.

20. The apparatus of claim 18, further comprising:
an error rate table manager configured to maintain the error rate table according to a moving average of at least one of a ratio of data block acknowledgements to transmitted data blocks, a ratio of data block negative acknowledgements to transmitted data blocks, or a ratio of data block acknowledgements to data block negative acknowledgements.

21. The apparatus of claim 20, wherein the error rate table manager is further configured to calculate the moving average according to a movement speed of a mobile device.

22. The apparatus of claim 18, wherein the channel condition value is represented by a channel quality indicator (CQI) value, the transmission parameter represents a data payload size of a data block and a forward error correction (FEC) strength of the data block, and the error rate represents a ratio of negative acknowledgements (NACKs) to acknowledgements (ACKs).

23. The apparatus of claim 18, wherein the apparatus is configured to operate as a Long Term Evolution (LTE) or Universal Mobile Telecommunications System (UMTS) communications system device.

24. The apparatus of claim 18, wherein the apparatus is at least one of a Node-B or a Radio Network Controller (RNC).

25. An apparatus for link adaptation in a communications network, comprising:
  means for maintaining an error rate array in a storage component,
    wherein the error rate array has at least a channel condition value and a transmission parameter,
    wherein the transmission parameter is a set of transmission parameters corresponding to data transmission capabilities of the communications network;
  means for selecting at least one element of the error rate array corresponding to a current condition of a communications channel;
  means for selecting an individual transmission parameter of the set of transmission parameters,
    wherein the individual transmission parameter is selected based on the selected at least one element of the error rate array; and,
  means for transmitting data according to the selected individual transmission parameter.

26. The apparatus of claim 25, wherein each of the transmission parameters is associated with an estimated or actual throughput.

27. The method of claim 25, wherein the means for selecting the individual transmission parameter includes:
  means for determining expected throughputs for each of the transmission parameters according to expected error rates of data transmitted at the selected channel condition value; and
  means for selecting the individual transmission parameter according to the determined expected throughputs.

28. The method of claim 25, wherein the means for maintaining the error rate array includes:
  means for initializing the elements according to simulated data;
  means for adjusting, in substantially real-time, the elements by:
    transmitting data blocks at multiple channel condition values according to multiple transmission parameters; and
    determining whether the transmitted data blocks are successfully received by a recipient; and
  means for calculating moving averages of the adjusted elements.

29. The method of claim 25, wherein the channel condition value is represented by at least one of a channel quality indicator (CQI) value, a signal to noise ratio (SNR), a carrier to interference ratio (C/I) value, a bit error rate (BER), a frame error rate (FER), or a received signal strength indicator (RSSI) value.

30. The method of claim 25, wherein the transmission parameter corresponds to at least one of a transport block size (TBS) value, a radio frequency (RF) level, or a modulation type.

* * * * *